(12) United States Patent
Wilson et al.

(10) Patent No.: US 9,551,451 B2
(45) Date of Patent: Jan. 24, 2017

(54) SKID STRUCTURE FOR A POWERTRAIN

(71) Applicant: Electro-Motive Diesel, Inc., LaGrange, IL (US)

(72) Inventors: Jess Daniel Wilson, Lisle, IL (US); James Leonard Blase, Lemont, IL (US); Grace Louise Madden, Chicago, IL (US); Michael Colarossi, Forest Park, IL (US)

(73) Assignee: Electro-Motive Diesel, Inc., La Grange, IL (US)

( * ) Notice: Subject to any disclaimer, the term of this patent is extended or adjusted under 35 U.S.C. 154(b) by 0 days.

(21) Appl. No.: 14/676,036

(22) Filed: Apr. 1, 2015

(65) Prior Publication Data

US 2016/0290551 A1   Oct. 6, 2016

(51) Int. Cl.
*F16M 11/00*  (2006.01)
*F16M 5/00*  (2006.01)
*F16H 57/025*  (2012.01)

(52) U.S. Cl.
CPC .............. *F16M 5/00* (2013.01); *F16H 57/025* (2013.01)

(58) Field of Classification Search
CPC .............. F16M 5/00; F16M 7/00; F16M 1/00; F16M 1/04; F16H 57/025; B65D 71/0092; B65D 90/16
USPC ........................................................ 248/678
See application file for complete search history.

(56) References Cited

U.S. PATENT DOCUMENTS

| 1,765,559 A | 6/1930 | Armstrong |
| 5,085,396 A * | 2/1992 | Mansson ................ B65D 85/68 248/676 |
| 6,520,124 B2 * | 2/2003 | Bohm, II ................ F02B 63/04 123/2 |
| 8,857,781 B2 | 10/2014 | Wang et al. |
| 2002/0112653 A1 * | 8/2002 | Moore, Jr. .......... B65D 19/0012 108/57.25 |
| 2013/0106113 A1 * | 5/2013 | Wang ...................... F16M 7/00 290/1 A |

FOREIGN PATENT DOCUMENTS

| CN | 201621432 | 11/2010 |
| CN | 202252648 | 5/2012 |
| CN | 102653274 | 9/2012 |
| JP | 2010106698 | 5/2010 |

* cited by examiner

*Primary Examiner* — Christopher E Garft
(74) *Attorney, Agent, or Firm* — Hibshman Claim Contruction PLLC

(57) ABSTRACT

A skid structure for a powertrain includes a pair of longitudinally extending members disposed about a central axis and in a mutually spaced apart relationship with one another. Each of the members includes a top wall; a bottom wall disposed in a spaced apart relation with the top wall; and a side wall connected at corresponding edges of the top and bottom walls to define a pocket therebetween. The pocket is configured to extend longitudinally along a length of the member and laterally along a width of the top and bottom walls. The skid structure further includes multiple gussets that are disposed within the pocket and interspaced from one another along the length of the member. Each gusset is configured to connect with at least two of the top wall, the bottom wall, and the side wall. The gussets are configured to support a weight of the powertrain thereon.

16 Claims, 4 Drawing Sheets

SKID STRUCTURE FOR A POWERTRAIN

TECHNICAL FIELD

The present disclosure relates to a skid structure, and more particularly to a skid structure for a powertrain.

BACKGROUND

A skid structure for a powertrain encounters torsional loads arising from operation of the powertrain. A shape, size and construction of the skid structure are typically selected such that the skid structure is able to bear the torsional loads from the powertrain. More often than not, skid structures end up being large, heavy and/or bulky when manufactured to conventionally derived specifications that are known to withstand torsional loads.

However, in some cases, tight space constraints may present difficulties in the mounting of a large skid structure for a given powertrain. In other cases, the size, shape, and/or construction of the skid structure may need to comply with various regulations governing a height and weight of a powertrain assembly. Hence, these regulations may in turn dictate the size, shape, and/or other constructional features of the skid structure. Therefore, producing a skid structure with a compact yet sturdy configuration i.e., having adequate stiffness to withstand torsional loads from operation of a powertrain, and complying with various height and weight regulations can be a real challenge to manufacturers.

For reference, U.S. Pat. No. 8,857,781 (the '781 patent) discloses a modular skid base is provided for supporting, for example, a power generation system that includes a prime mover (e.g., an engine) and a driven machine (e.g., an alternator; a generator; a compressor; a pump; a gear drive for, for example, heavy industrial applications; or any other type of load device). The modular skid base includes a pair of first support skid rails and a pair of second support skid rails. The modular skid base also includes an overlapping section that includes a portion of the second support skid rails overlapping a portion of the first support skid rails along a length direction of the modular skid base. The overlapping section can provide stiffness where required without adding height and mass to the entire modular skid base. However, the overlapping section disclosed in the '781 patent adds width to the skid base thereby making the skid base larger in width. Hence, there is a need for a skid structure that overcomes the aforesaid shortcomings and provides for skid structure with a sturdy and compact configuration while also having adequate stiffness to withstand the torsional loads.

SUMMARY

In one aspect of the present disclosure, a skid structure for a powertrain includes a pair of longitudinally extending members disposed about a central axis and in a mutually spaced apart relationship with one another. Each of the members includes a top wall; a bottom wall disposed in a spaced apart relation with the top wall; and a side wall connected at corresponding edges of the top and bottom walls to define a pocket therebetween. The pocket is configured to extend longitudinally along a length of the member and laterally along a width of the top and bottom walls. The skid structure further includes multiple gussets that are disposed within the pocket and interspaced from one another along the length of the member. Each gusset is configured to connect with at least two of the top wall, the bottom wall, and the side wall. The gussets are configured to support a weight of the powertrain thereon.

In another aspect of the present disclosure, a bottom side of the bottom wall of each member is configured to define a multiple recessed portions. Each of the recessed portions is adapted to at least partly receive an isolation mount therein.

In yet another aspect of the present disclosure, a powertrain assembly includes a powertrain having a prime mover and a driven equipment rotatably coupled to the prime mover. The powertrain assembly employs the skid structure disclosed in embodiments herein to rigidly support the prime mover and the driven equipment thereon.

Other features and aspects of this disclosure will be apparent from the following description and the accompanying drawings.

DETAILED DESCRIPTION

The present disclosure relates to a skid structure for a powertrain. Wherever possible the same reference numbers will be used throughout the drawings to refer to same or like parts. Moreover, references to various elements described herein, are made collectively or individually when there may be more than one element of the same type. However, such references are rendered to merely aid the reader's understanding of the present disclosure and hence, to be considered exemplary in nature. Accordingly, it may be noted that any such reference to elements in the singular is also to be construed to relate to the plural and vice versa without limiting the scope of the disclosure to the exact number or type of such elements unless set forth explicitly in the appended claims.

Figure 1:
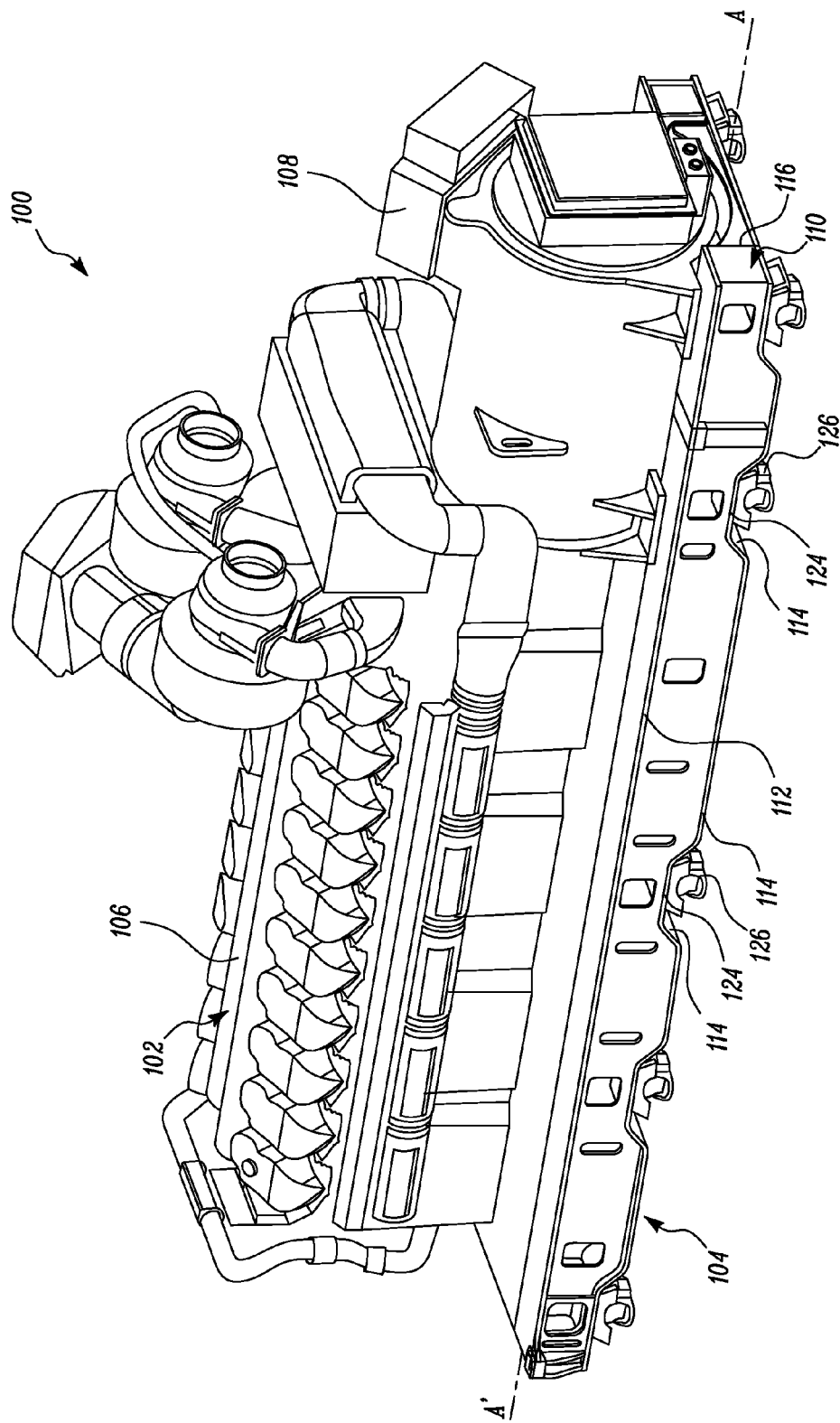
FIG. 1 is a perspective view of a powertrain assembly, in accordance with an embodiment of the present disclosure.

FIG. 1 illustrates a powertrain assembly 100, in accordance with an embodiment of the present disclosure. The powertrain assembly 100 may be configured for use in various industrial applications such as, for e.g., in a locomotive 400 (see FIG. 4), in heavy industrial applications, and the like. As shown, the powertrain assembly 100 includes a powertrain 102, and a skid structure 104 that is configured to support the powertrain 102 thereon. The powertrain 102 includes a prime mover 106. In the illustrated embodiment of FIG. 1, the prime mover 106 is embodied as an engine. Moreover, the engine may be a petrol engine, a diesel engine, or any other kind of engine utilizing combustion of fuel for generation of power. However, in an alternative embodiment, the present disclosure may be equally implemented by way of using an electric motor or a gas turbine engine in place of the engine as the prime mover 106. Therefore, any type of prime mover commonly known in the art may be employed without deviating from the spirit of the present disclosure.

The powertrain 102 further includes a driven equipment 108 that is rotatably coupled to the prime mover 106. The driven equipment 108, as shown in FIG. 1, is embodied in the form of a generator. However, it is to be noted a type of driven equipment used is merely exemplary in nature and hence, non-limiting of this disclosure. Although a generator is disclosed herein, one skilled in the art will appreciate that other types of driven equipment such as, but not limited to, an alternator; a compressor; a pump; a gear drive; or any other type of load device can be optionally employed in lieu of the generator without deviating from the spirit of the present disclosure.

Figure 4:
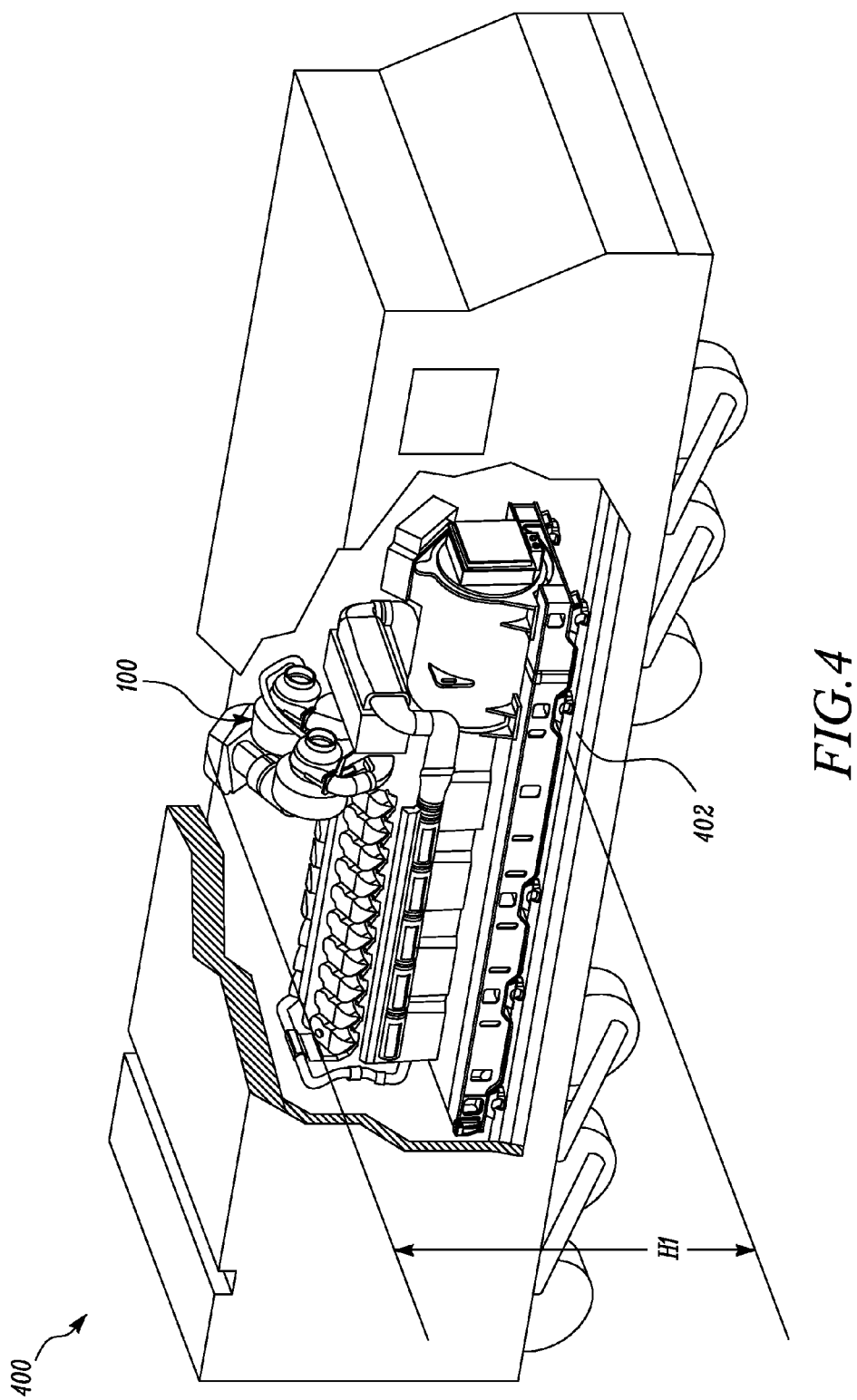
FIG. 4 is a partial breakaway view of an exemplary locomotive employing the powertrain assembly of the present disclosure.

With continued reference to FIG. 1, the skid structure 104 is configured to rigidly support the prime mover 106 and the driven equipment 108 thereon. The skid structure 104 may be configured to mount onto an underframe carriage 402 of a locomotive 400 as shown in FIG. 4, or may be placed on a shop floor bed (not shown) when employed in other types of industrial settings.

Figure 2:
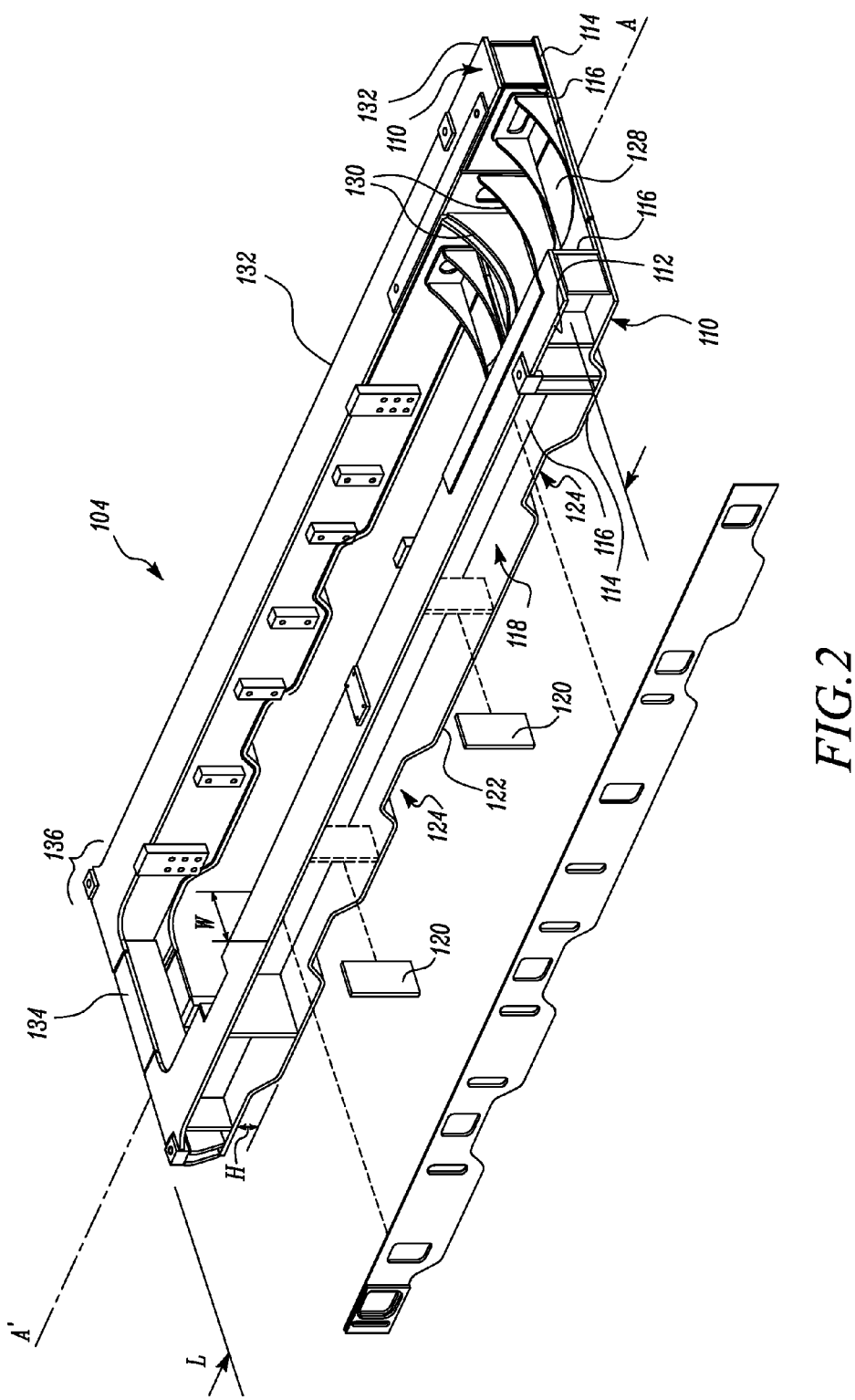
FIG. 2 is a partially exploded view of a skid structure employed by the powertrain assembly of FIG. 1.

Referring to FIG. 2, a partially exploded view of the skid structure 104 is shown. The skid structure 104 includes a pair of longitudinally extending members 110 that are disposed about a central axis A-A' and in a mutually spaced apart relationship with one another. As shown, each of the members 110 includes a top wall 112; a bottom wall 114 disposed in a spaced apart relation with the top wall 112; and a side wall 116 that is connected at corresponding edges of the top and bottom walls 112, 114 to define a pocket 118 therebetween.

As shown, the pocket 118 is configured to extend longitudinally along a length L of the respective member 110 and laterally along a width W of the top and bottom walls 112, 114. In the illustrated embodiment of FIG. 1, the side wall 116 of each longitudinally extending member 110 is disposed proximal to the central axis A-A'. Therefore, in this embodiment, the pocket 118 from each longitudinally extending member 110 is located distally away from the central axis A-A'. However, in another embodiment, the side wall 116 of each longitudinally extending member 110 could optionally be disposed distally away from the central axis A-A' thereby rendering the pocket 118 proximal to the central axis A-A'.

Figure 3:
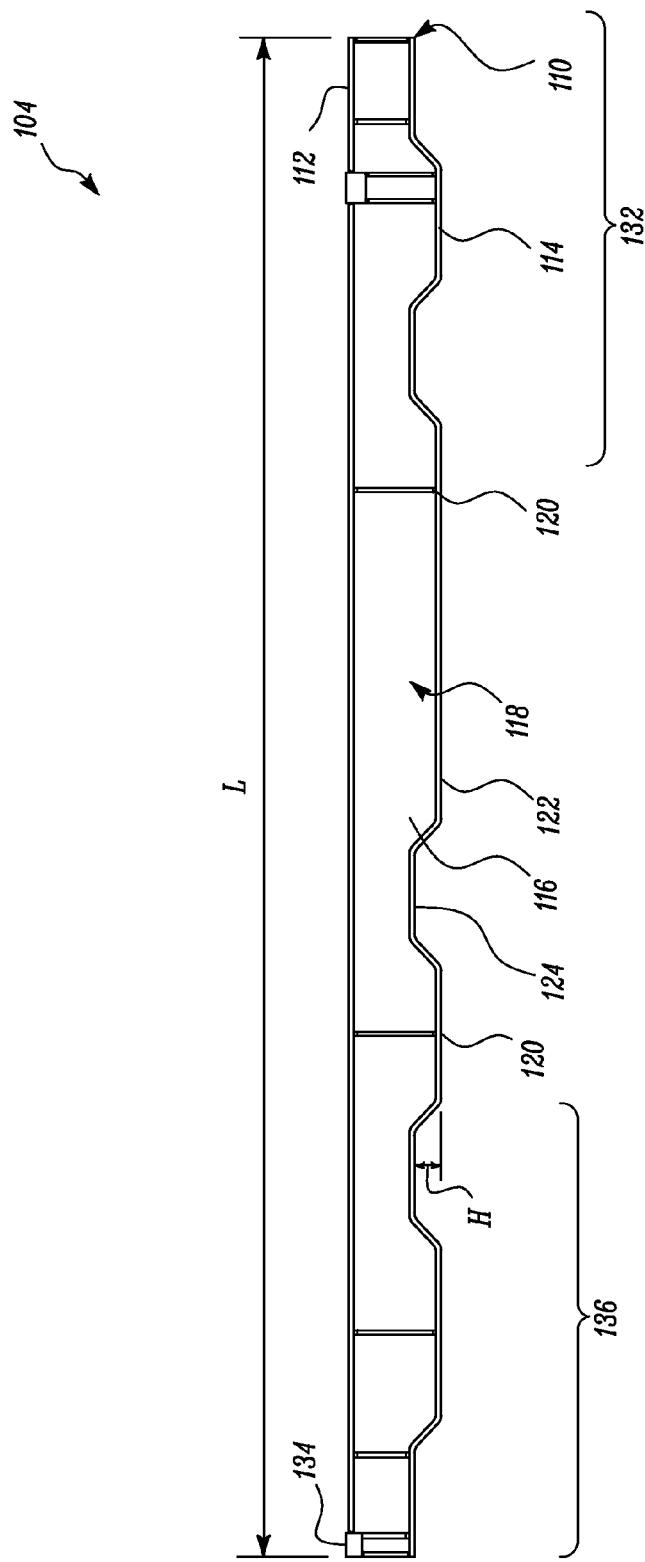
FIG. 3 is a side sectional view of the skid structure showing gussets therein, in accordance with an embodiment of the present disclosure.

Referring to FIGS. 2 and 3, the skid structure 104 further includes multiple gussets 120 that are disposed within the pocket 118 and interspaced from one another along the length L of the member 110. Each gusset is configured to connect with at least two of the top wall 112, the bottom wall 114, and the side wall 116. For example, as shown in FIG. 2, each gusset may be configured to connect with the top wall 112, the bottom wall 114, and the side wall 116. Accordingly, in the illustrated embodiment of FIGS. 2 and 3, a shape of the gusset is quadrangular so as to allow the gusset to connect with each one of the top, bottom, and side walls 112, 114, and 116.

However, in another exemplary embodiment, some of the gussets 120 may be configured to connect with the top wall 112 and the side wall 116 alone while the remaining gussets 120 may be configured to connect with side wall 116 and the bottom wall 114 alone. Accordingly, these gussets 120 may be formed to have a triangular shape or any other suitable shape to allow connection with a pair of adjoining walls of the member 110. In an alternative embodiment, each of the gussets 120 may be configured to connect with the top wall 112 and the bottom wall 114 alone. One of ordinary skill in the art will acknowledge that the shape of the gussets 120 may be correspondingly selected depending on the walls of the member 110, the gusset would connect with.

In an aspect of the present disclosure, the gussets 120 are configured to support a weight of the powertrain 102 thereon. The gussets 120 may be made from plate steel, or any other type of steel having a suitable grade for a specific application. The gussets 120 may be welded to the top wall 112, the bottom wall 114 and/or the side wall 116 of the longitudinally extending member 110 using various commonly known welding techniques such as, but not limited to, Thermal Inert Gas (TIG) welding, Metal Inert Gas (MIG) welding, arc welding, laser welding, and the like.

Moreover, in an embodiment as shown in FIGS. 1, 2 and 3, a bottom side 122 of the bottom wall 114 of each member 110 is configured to define multiple recessed portions 124. Each of the recessed portions 124 is adapted to at least partly receive an isolation mount 126 (See FIG. 1) therein. The isolation mounts 126 may include dampers, springs and/or other components that may be typically required to absorb vibrations from operation of the prime mover 106 and the driven equipment 108. Explanation pertaining to a type and/or configuration of the isolation mounts 126 has been omitted herein for purposes of brevity and clarity in understanding of the present disclosure.

As some portions along the length L of the bottom wall 114 protrude upwardly i.e., towards the top wall 112 to define the recessed portions 124, each of the recessed portions 124 is configured to have a height 'H' taken or measured from a remainder of the bottom wall 114. This height H allows the isolation mounts 126 to be at least partly received within the recessed portion 124 thereby causing little or no change in an overall height H1 of the powertrain assembly 100 (See FIG. 4) when the powertrain 102 is bolted onto the skid structure 104 of the present disclosure and installed at a given location for e.g., on the underframe 402 carriage of the locomotive 400 as shown in FIG. 4.

In another embodiment as shown in FIG. 2, the skid structure 104 further includes a cradle 128 that is disposed between the longitudinally extending members 110. The cradle 128 is configured to at least support the driven equipment 108 for e.g., the generator of the powertrain 102 thereon. In the illustrated embodiment of FIG. 2, the cradle 128 is shown to include one or more ribs 130 that are configured to extend between corresponding fore portions 132 of the longitudinally extending members 110.

In yet another embodiment as shown in FIG. 2, the skid structure 104 further includes a support bar 134 laterally extending between aft portions 136 of each longitudinally extending member 110. The support bar 134 is configured to support the prime mover 106 of the powertrain 102 thereon.

Various embodiments disclosed herein are to be taken in the illustrative and explanatory sense, and should in no way be construed as limiting of the present disclosure. All joinder references e.g., attached, affixed, coupled, engaged, connected, and the like are only used to aid the reader's understanding of the present disclosure, and may not create limitations, particularly as to the position, orientation, or use of the systems, processes, and/or methods disclosed herein. Therefore, joinder references, if any, are to be construed broadly. Moreover, such joinder references do not necessarily infer that two elements are directly connected to each other. Moreover, expressions such as "including", "comprising", "incorporating", "consisting of", "containing", "having", and the like, used to describe and claim the present disclosure, are intended to be construed in a non-exclusive manner, namely allowing for components or elements not explicitly described also to be present.

Additionally, all numerical terms, such as, but not limited to, "first", "second", "third", or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It is to be understood that individual features shown or described for one embodiment may be combined with individual features shown or described for another embodiment. The above-described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

Embodiments of the present disclosure have applicability for use and implementation in mounting of powertrains onto an underframe carriage of a locomotive or on shop floor beds when employed in various types of industrial settings.

Previously known configurations of skid structures were large, heavy, or bulky. Although such skid structures may have been manufactured to withstand torsional loads from the powertrain, such skid structures were difficult to install in locations having tight space constraints. Moreover, a construction of these skid structures may entail a change in the overall height of the powertrain assembly when installed at a location, for e.g., on an underframe carriage of a locomotive; thereby preventing the powertrain assembly from complying with regulations governing the mounting and installation of powertrains.

However, with use of the skid structure 104 disclosed herein, the isolation mounts 126 are received within the recessed portions 124 of the bottom wall 114. The height H of the recessed portions 124 may help each of the isolation mounts 126 to be at least partly received with the respective recessed portions 124 thereby preventing an increase in the overall height H1 of the powertrain assembly 100. Thus, little or no change may occur to the overall height H1 of the powertrain assembly 100 when assembling the powertrain 102 at a location. Further, the skid structure 104 of the present disclosure may help the powertrain assembly 100 to comply with regulations that typically govern the mounting and installation of powertrains at various locations.

Moreover, in many cases, previously known skid structures employed straight section tubes or rails to support the powertrain thereon. Use of such straight section tubes or rails may impart only a limited amount of stiffness to the overall construction of the skid structure, thereby making the skid structure vulnerable to torsional loads from the powertrain.

With use of the embodiments disclosed herein, the bottom wall 114 of each longitudinally extending member 110 is characterized to define recessed portions 124. These recessed portions 124 may impart the skid structure 104 with added strength and stiffness to withstand operational forces, esp., torsional loads from the powertrain 102 and/or the driven equipment 104. Therefore, with implementation of the present disclosure, manufacturers of skid structures for powertrains can easily produce skid structures that offer improved stiffness while also complying with various regulations governing the height and weight of powertrain assemblies during installation.

While aspects of the present disclosure have been particularly shown and described with reference to the embodiments above, it will be understood that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

We claim:

1. A skid structure for a powertrain, the skid structure comprising:
   a pair of longitudinally extending members disposed about a central axis and in a mutually spaced apart relationship with one another, each member of the pair of longitudinally extending members comprising
      a top wall,
      a bottom wall spaced apart from the top wall along a height direction of the skid structure, and
      a side wall connected at corresponding edges of the top and bottom walls to define a pocket therebetween, the pocket extending longitudinally along a length of the member and laterally along a width of the top and bottom walls,
      a bottom side of each bottom wall defining a plurality of recessed portions, a concavity of each recessed portion of the plurality of recessed portions facing away from the top wall along the height direction;
   an isolation mount disposed in each recessed portion of the plurality of recessed portions; and
   a plurality of gussets disposed within the pocket and interspaced from one another along the length of the member, each gusset of the plurality of gussets being connected to at least two of the top wall, the bottom wall, and the side wall, the plurality of gussets being configured to support thereon at least part of a weight of the powertrain.

2. The skid structure of claim 1, wherein the side wall of each member is disposed proximal to the central axis along the width of the top and bottom walls.

3. The skid structure of claim 1, wherein the side wall of each member is disposed distal to the central axis along the width of the top and bottom walls.

4. The skid structure of claim 1, further comprising a cradle disposed between the longitudinally extending members, the cradle being configured to support thereon at least part of a driven equipment of the powertrain.

5. The skid structure of claim 4, wherein the cradle includes one or more ribs extending between corresponding fore portions of the pair of longitudinally extending members.

6. The skid structure of claim 1, further comprising at least one support bar laterally extending between aft portions of each member, the support bar being configured to support thereon a prime mover of the powertrain.

7. A powertrain assembly comprising:
   a powertrain comprising:
      a prime mover; and
      a driven equipment rotatably coupled to the prime mover; and
   a skid structure configured to rigidly support the prime mover and the driven equipment thereon, the skid structure comprising:
      a pair of longitudinally extending members disposed about a central axis and in a mutually spaced apart relationship with one another, each member of the pair of longitudinally extending members comprising:
a top wall;
a bottom wall spaced apart from the top wall along a height direction of the skid structure; and
a side wall connected at corresponding edges of the top and bottom walls to define a pocket therebetween, the pocket extending longitudinally along a length of the member and laterally along a width of the top and bottom walls,
a bottom side of each bottom wall defining a plurality of recessed portions, a concavity of each recessed portion of the plurality of recessed portions facing away from the top wall along the height direction;
an isolation maount disposed in each recessed portion of the plurality of recessed poetions; and
a plurality of gussets disposed within the pocket and interspaced from one another along the length of the member, each gusset of the plurality of gussets being connected to at least two of the top wall, the bottom wall, and the side wall, the plurality of gussets being configured to support thereon at least part of a weight of the powertrain.

8. The powertrain assembly of claim 7, wherein the side wall of each member is disposed proximal to the central axis along the width of the top and bottom walls.

9. The powertrain assembly of claim 7, wherein the side wall of each member is disposed distal to the central axis along the width of the top and bottom walls.

10. The powertrain assembly of claim 7, wherein the skid structure further comprises a cradle disposed between the pair of longitudinally extending members, the cradle being configured to support thereon at least part of a driven equipment of the powertrain.

11. The powertrain assembly of claim 10, wherein the cradle includes one or more ribs extending between corresponding fore portions of the pair of longitudinally extending members.

12. The powertrain assembly of claim 7, wherein the skid structure further comprises at least one support bar laterally extending between aft portions of each member, the support bar being configured to support thereon a prime mover of the powertrain.

13. The powertrain assembly of claim 7, wherein the prime mover is an engine.

14. The powertrain assembly of claim 7, wherein the driven equipment is a generator.

15. The skid structure of claim 1, wherein
the plurality of recessed portions includes a first recessed portion, a second recessed portion, and a third recessed portion,
the plurality of gussets includes a first gusset and a second gusset,
the first gusset is disposed between the first recessed portion and the second recessed portion along the length of the member, and
the second gusset is disposed between the second recessed portion and the third recessed portion along the length of the member.

16. The powertrain assembly of claim 7, wherein
the plurality of recessed portions includes a first recessed portion, a second recessed portion, and a third recessed portion,
the plurality of gussets includes a first gusset and a second gusset,
the first gusset is disposed between the first recessed portion and the second recessed portion along the length of the member, and
the second gusset is disposed between the second recessed portion and the third recessed portion along the length of the member.

* * * * *

UNITED STATES PATENT AND TRADEMARK OFFICE
CERTIFICATE OF CORRECTION

PATENT NO. : 9,551,451 B2
APPLICATION NO. : 14/676036
DATED : January 24, 2017
INVENTOR(S) : Wilson et al.

Page 1 of 1

It is certified that error appears in the above-identified patent and that said Letters Patent is hereby corrected as shown below:

In the Claims

Column 7, Line 18, In Claim 7, delete "maount" and insert -- mount --.

Column 7, Line 19, In Claim 7, delete "poetions;" and insert -- portions; --.

Signed and Sealed this
Twenty-third Day of May, 2017

Michelle K. Lee
*Director of the United States Patent and Trademark Office*